US008521340B2

(12) United States Patent
Coulmeau

(10) Patent No.: US 8,521,340 B2
(45) Date of Patent: Aug. 27, 2013

(54) DEVICE AND METHOD OF AUTOMATED CONSTRUCTION OF EMERGENCY FLIGHT PATH FOR AIRCRAFT

(75) Inventor: François Coulmeau, Seilh (FR)

(73) Assignee: Thales, Neuilly sur Seine (FR)

( * ) Notice: Subject to any disclaimer, the term of this patent is extended or adjusted under 35 U.S.C. 154(b) by 1363 days.

(21) Appl. No.: 11/567,948

(22) Filed: Dec. 7, 2006

(65) Prior Publication Data

US 2007/0129855 A1 Jun. 7, 2007

(30) Foreign Application Priority Data

Dec. 7, 2005 (FR) ...................................... 05 12423

(51) Int. Cl.
*G01C 23/00* (2006.01)

(52) U.S. Cl.
USPC ................... 701/3; 701/120; 701/14; 701/16; 701/301; 340/945; 340/961

(58) Field of Classification Search
USPC ................... 701/3, 11, 14, 102, 206, 16, 301; 340/963, 945, 961
See application file for complete search history.

(56) References Cited

U.S. PATENT DOCUMENTS 6,633,801 B1 * 10/2003 Durlacher et al. ................ 701/9
6,641,087 B1 * 11/2003 Nelson ....................... 244/118.5
6,643,580 B1 * 11/2003 Naimer et al. ................ 701/467
6,658,572 B1 * 12/2003 Craig ............................. 726/16
6,665,631 B2 * 12/2003 Steinbrecher ................. 702/159
6,816,780 B2 * 11/2004 Naimer et al. ................ 701/467
6,845,302 B2 * 1/2005 Moretto ............................ 701/3
6,856,864 B1 * 2/2005 Gibbs et al. ........................ 701/3
7,098,810 B2 * 8/2006 Bateman et al. .............. 340/963
7,193,520 B2 * 3/2007 Shear ............................ 340/574
7,343,239 B2 * 3/2008 Tanabe .......................... 701/102
7,437,225 B1 * 10/2008 Rathinam ....................... 701/14
7,837,143 B2 * 11/2010 Matos .......................... 244/75.1
2004/0111192 A1 6/2004 Naimer et al.
2004/0215372 A1 * 10/2004 Bateman et al. .................. 701/1
2007/0129855 A1 * 6/2007 Coulmeau ......................... 701/3

FOREIGN PATENT DOCUMENTS

EP 0 743 580 A 11/1996
FR 2 872 316 A 12/2005

* cited by examiner

*Primary Examiner* — Thomas G. Black
*Assistant Examiner* — Wae Louie
(74) *Attorney, Agent, or Firm* — Lowe Hauptman & Ham, LLP

(57) ABSTRACT

The invention relates to a flight management system for manned or unmanned aircraft having to face an emergency situation such as hijacking of the aircraft, medical emergencies, situations of failures affecting the propulsion, pressurization or communication functions for example. It provides for a device and process for automatically or semi-automatically generating a flight plan compatible with international regulations and their national or local adaptations with possibilities of optimization according to navigation parameters.

23 Claims, 8 Drawing Sheets

DEVICE AND METHOD OF AUTOMATED CONSTRUCTION OF EMERGENCY FLIGHT PATH FOR AIRCRAFT

RELATED APPLICATION

The present application is based on, and claims priority from France Application Number 05 12423, filed Dec. 7, 2005, the disclosure of which is hereby incorporated by reference herein in its entirety.

BACKGROUND OF THE INVENTION

The present invention applies to flight management systems for aircraft with or without a pilot on board. Such systems provide pilot assistance functions for determining the route to be followed by the aircraft to home in on its destination from its departure point taking into account the regulatory and operational constraints to be observed.

These constraints include the procedures to be employed in given emergencies as prescribed by international organizations, state and airport authorities. In particular, such cases include aircraft hijacking, medical emergencies, malfunctions affecting the aircraft's flight qualities (engine, pressurization, etc.), communication failures, making ground/air or air/air dialogue, and accordingly control of the aircraft in question impossible. According to Eurocontrol, the body responsible for controlling European airspace, such communication failures (Prolonged Loss of Communication or PLOC) involved over 1000 flights between 1999 and 2005. These failures increase the risk of collision and have a significant cost since they must be taken into account in air traffic control design to enable traffic reorganization when they occur. In the extreme, these failures mean forcing the airplane to the ground by fighter planes.

The procedures to be employed in these emergencies depend on the location of the aircraft, which determines the applicable regulations. They are therefore voluminous and complex. Furthermore, they do not prescribe any single solution that can be directly integrated into a flight management system since a choice must be made from an infinite number of options. This explains why in the present state of the art there is no solution for automatically or semi-automatically taking these procedures into account in a flight management system. This is a significant drawback for aircraft with a pilot on board, since there is a heightened risk of misapplication of complex procedures by the crew and potential breaches of security are greater. It is a completely unacceptable drawback for military aircraft whose pilot is not on board, known as drones. These may be authorized to fly in non-segregated airspace, i.e. shared by civil aircraft, only if they are able to apply the same regulations and procedures, particularly in the event of an emergency situation. But currently this cannot be ensured for a drone, particularly in the event of a communication failure. In fact, if it is the control link that is interrupted, the extreme solution of instructions visually communicated by fighter planes is not applicable; if it is the link between the drone and its pilot that is interrupted, the latter cannot give any instruction to the aircraft. The solution to the problem consisting in automatically or semi-automatically taking account of procedures to be applied in emergency situations in a flight management system is therefore particularly critical.

SUMMARY OF THE INVENTION

To this end, the present invention provides an aircraft navigation aid device including means for preparing a flight plan and path of said aircraft including a navigation database, characterized in that it further includes means of storage in the form of a computer database of procedures to be used in predefined emergency situations and means of computer processing enabling the flight plan and path in progress to be modified in accordance with the procedures applicable to each emergency situation and optimally for a preference function chosen from a combination of navigation criteria.

It also provides a method of using said device.

It offers the advantage of great versatility, since it is adapted to different emergency situations described above, to different flight configurations ('en route', on takeoff or on approach), to aircraft whose pilot is on board or not and it can also be used in pilot assistance automatic or semi-automatic mode.

BRIEF DESCRIPTION OF THE DRAWINGS

The invention will be better understood and its different features and advantages will emerge from the disclosure which follows several examples of embodiment and its accompanying figures, of which.

Figure 1:
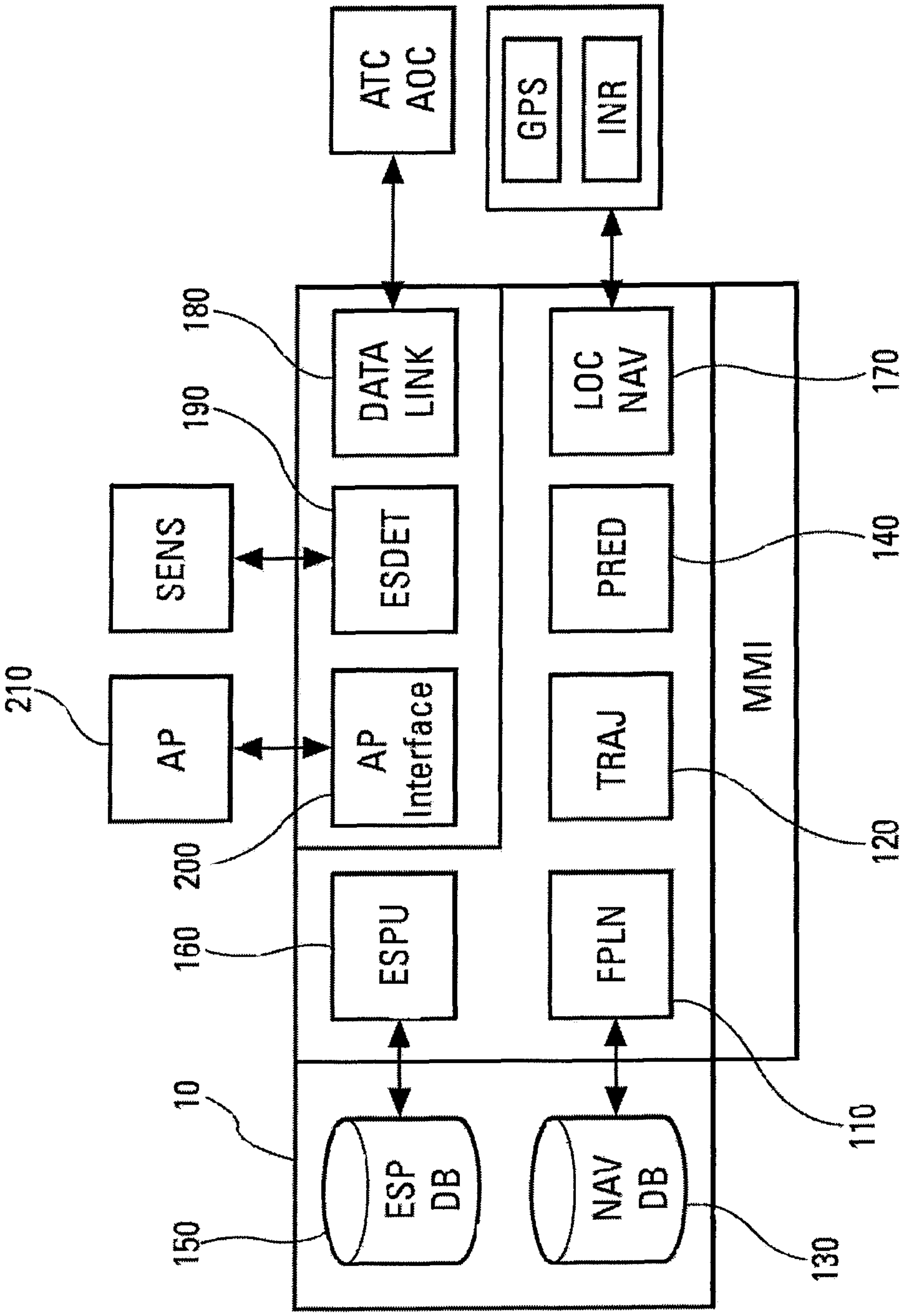
FIG. 1 depicts the functional architecture of a flight management system incorporating the invention.

In the disclosure and the figures, the initials, acronyms and abbreviations have their meanings in French and English shown in the table below. We show the meaning in English since this is what is used in everyday language by persons skilled in the art, even in France.

| Acronym | Meaning in English | Meaning in French |
|---|---|---|
| ADS-B | Automatic Dependent Surveillance - Broadcast | Surveillance automatique de dépendance - Broadcast |
| AOC | Airline Operations Center | Centre d'opérations de la compagnie aérienne |
| AP | Auto pilot | Pilote automatique |
| AP INTERFACE | AP interface | Interface avec le pilote automatique |

-continued

| Acronym | Meaning in English | Meaning in French |
|---|---|---|
| ARINC | Aeronautical Radio Inc | Organisme de normalisation aéronautique |
| APP | Approach | Phase d'approche |
| ATC | Air Trafic Control | Contrôle du trafic aérien |
| BDN/NAVDB | Navigation database | Base de données de navigation |
| BDP/USDB | Urgency [Emergency] Situation Procedures database | Base de données informatique des procédures d'urgence |
| CMS | Constant Mach Segment | Segment de vol à mach constant |
| CRZ FL | Cruise Flight Level | Altitude de croisière du vol |
| DATALINK | Digital Communication link | Liaison de communication numérique |
| DES | Descent | Phase de descente |
| DME | Distance Measurement Equipment | Equipement de mesure de distance |
| DO-236B | RTCA group document describing among other things the speeds required for certain procedures. | |
| ESDET | Emergency Situation Detection | Détection de situation d'urgence |
| ESPU | Emergency Situation Processing Unit | Unité de traitement des situations d'urgence |
| ETOPS | Extended range with Twin engine aircraft Operations | Opérations d'avion long courier bi-moteur |
| FLS | FMS Landing system | Système d'atterrissage FMS |
| FMS | Flight Management system | Système de gestion de vol |
| FPLN | Flight Plan | Plan de vol |
| GALILEO | European GPS [satellite] constellation | |
| GLIDE | Radio beam in the vertical plane for precision guidance in ILS approach | |
| GLS | GPS Landing system | Système d'approche utilisant le GPS |
| GPS | Global Positioning system | Système de positionnement global |
| HOLD | Holding Pattern | Boucle d'attente en approche, souvent appelée hippodrome |
| IAF | Initial Approach Fix | Point fixe d'approche initiale |
| ILS | Instrument Landing system | Système d'atterrissage aux instruments |
| IMC | Instrument Meteorological Conditions | Conditions météo pour le vol aux instruments |
| INR | Inertial sensors | Capteurs d'inertie |
| LOCNAV | Localization means for navigation | Moyens de localisation pour la navigation |
| MLS | Microwave Landing system | Système d'atterrissage micro-ondes |
| MMI | Man Machine Interface | Interface homme machine |
| MORA | Minimum Off Route Altitude | Altitude minimale hors route |
| MSA | Minimum Sector Altitude | Altitude minimale du secteur |
| NAVDB/BDN | Navigation database | Base de données de navigation |
| NDB | Non-Directional Beacon | Balise sol permettant la localisation par relèvement |
| NM | Nautical Mile | Mille nautique |
| OACI | Organisation de l'Aviation Civile Internationale | International Civil Aviation Organization (ICAO) |
| PANS | Procedure for Air Navigation services (ICAO documents) | Procédure pour les services de navigation aérienne (documents OCI) |
| PRED | Prediction | Prédiction |
| RNP | Required Navigation Performance | Performance prescrite de navigation |
| SENS | Sensors | Capteurs |
| SID | Standard Instrument Departure | Décollage standard aux instruments |
| SSR | Secondary surveillance Radar | Radar secondaire de surveillance |
| STAR | Standard Terminal Arrival Route | Route terminale standard |
| STEP | Cruise level change | Changement de niveau en croisière |
| TCDS | Terrain Collision Avoidance System | Système anti-collision terrain |
| T/D | Top Of Descent | Point de fin de la croisière |
| TMA | Terminal Area | Zone terminale |
| TRAJ | Trajectory [Flight Path] | Trajectoire |
| UAV | Unmanned Aerial Vehicle (Drone) | Avion non piloté |
| ESPDB/BDP | Emergency Situation Procedures database | Base de données informatique des procédures d'urgence |
| VHF | Very High Frequency | Trés haute fréquence |

-continued

| Acronym | Meaning in English | Meaning in French |
|---|---|---|
| VMC | Visual Meteorological conditions | Conditions météo pour le vol à vue. |
| VOR | VHF Omni Range | Balise VHF omni directionnelle |

DETAILED DESCRIPTION

FIG. 1 shows the functional architecture of an FMS 10. Such systems are covered by the ARINC 702 standard (Advanced Flight Management Computer System, December 1996). They normally provide all or part of the functions of: navigation LOCNAV, 170, for optimum localization of the aircraft according to the means of geo-localization (GPS, GALILEO, VHF radio beacons, inertial units); flight plan FPLN, 110—Navigation database NAVDB, BDN, 130, for constructing geographical routes and procedures from data included in the databases (points, beacons, intercept or altitude legs, etc.); lateral flight path TRAJ, 120: for constructing a continuous flight path from flight plan points observing aircraft performances and confinement constraints (RNP); predictions PRED, 140: for constructing an optimized vertical profile on the lateral flight path; guidance, for guiding the aircraft on its 3 D flight path in the lateral and vertical planes, while optimizing speed; digital data link DATALINK, 180 for communicating with control centers and other aircraft.

For implementing the invention, only the flight plan and path preparation functions are necessary. However, FIG. 1 shows an FMS with all the functions above. It further comprises the additional functions necessary for implementing the invention. This means the computer database of procedures ESPDB, BDP, 150 and the computer processing module for implementing the invention ESPU, 160.

The computer database of procedures may advantageously be of the object type. It stores the data necessary for carrying out procedures. This information is derived from paper maps and compressed. The database will comprise without limitation: geographical data on TMAs (center of the cone, width, height); data on MSAs; legs for modeling takeoff procedures; data for modeling landing attempts (number of "Missed approach" type procedures to be performed before leaving the TMA); data for the 'En Route' part, such as the ICAO data (hold time at constant level), explained in section 1.1, the regional/state data amending the ICAO data (in particular, hold time, holding time on HOLD), the ICAO data on the arrivals to be effected (section 1.1), the data on the arrivals to follow on the airfields when they differ from ICAO data; validity dates which may be identical to those of the navigation database (updated every 28 days, or more often, via "patch", if procedures change in the meantime). These procedures are codified in the following documents drawn up on the basis of ICAO recommendations: Rules of the Air (Annex 2 of the Chicago Convention); Aeronautical Telecommunications (Annex 10); Procedures—Rules of the Air and Services, PANS-RAC Doc 4444; Procedures—Operations, PANS-OPS (Doc 8168). They may also be drawn up based on state amendments adapting these recommendations to particular situations.

These emergency procedures are currently described in international or state paper documents and collected together by the database suppliers. Some of these procedures (Annex 10, vol. II) are to be followed in the event of communication failure to try to establish emergency communications, to notify air traffic control services and other aircraft in the area of the situation and to request the assistance of these aircraft, for example by relaying messages from other aircraft. These procedures have little interaction with the flight plan and path preparation functions. The purpose of other procedures is to cleanly "pull out" the airplane from traffic so as to ensure separations between aircraft, as well as its safety vis-à-vis the relief.

The procedures to be employed will differ according to whether the aircraft is 'En Route', on Takeoff or on Approach.

In the event of communication failure between ground and air, as well as between aircraft (in the case of the Drone, one entails the other), in IMC, 'En Route', Annex 2 of the Chicago Convention, paragraph 3.6.5.2.2 prescribes:

- Maintaining the current speed and level, if necessary raised to the minimum altitude for 20 mins;
- Adjusting the level and speed in accordance with the active flight plan
- Flying up to the beacon recommended for the destination airport
- Holding pattern on the beacon in question, in descent, and keeping in the holding stack until the specified approach time or the time enabling landing at the estimated time (RTA) of the active flight plan.
- Instrument approach to the airport, using the beacon
- Landing within a maximum of 30 mins after the estimated time of arrival.
- In the event of on-board receiver failure, VHF transmission of the message "TRANSMITTING BLIND DUE TO RECEIVER FAILURE" (Annex 10, vol. II)
- In the event of transmission failure to an ATC center, VHF transmission "TRANSMITTING BLIND" (Annex 10, vol. II)
- Selection of the appropriate SSR on the transponder. (Annex 10, vol. II)

These procedures may be amended and modified by local regulations. In France, for example:

- 'En Route', the IAF is used instead of the beacon of the ICAO proc. Regarding terminal procedures of the STAR, APP, SID type, local regulations may lay down specific procedures. In France, for example, in the event that it is impossible to land for any reason, leaving the TMA within 30 mins according to the "LEAVING PROCEDURE" (Takeoff procedure) published on the airfield. The list of airfields impacted and their associated TMA is known. The "LEAVING PROCEDURE" procedures are known.

By way of example, in 2002, the procedures to be employed in emergency situations for the AGEN airfield are as follows:

- in the event of MISSED APPR (Missed Approach), climb in track to 1000 ft, then continue the climb by intercepting and following the DME ARC 27 NM from the VORDME AGN up to 3500 ft, then turn right, direction of the NDB AG
- "LEAVING PROCEDURE": in the event of 2 consecutive landing failures, leave the TMA by SID SECHE1W at the MSA On departure: continue the procedure up to the limits of the TMA, at the last assigned flight level, then climb to the CRZ FL.

All the procedures to follow in order to cleanly pull out of traffic and terminal areas, explained in the examples above, can be expressed in electronic flight plan terms and followed. As the examples demonstrate, there is a relatively wide margin of maneuver for most of these procedures, at the same time enabling optimization in terms of traffic, weather and performances, which the invention provides. The invention is also applicable to other emergency procedures such as:

a depressurization emergency: Emergency descent, defined in ICAO document DOC 7030. In this case, it is stipulated that the airplane must "be placed aside" i.e. deviate from its route, then wait for ATC instructions.

Engine failure on ETOPS certified twin engine aircraft: no ICAO standards, but manufacturers' recommendations for constructing a diversionary flight plan to the nearest ETOPS airport when an engine failure is detected 'en route' over the ocean.

The automation of these procedures requires significant interaction with the flight plan and path preparation functions. The computer processing module for implementing the invention consists of a software module capable of being executed on a standard FMS computer such as the THALES AVIONICS NEW FMS, currently flying on the whole Airbus product range (redundant computer) . . . . The source program will advantageously be programmed in ADA or C complying with the standards to be observed for the code to be able to be certified.

The process coded by the program ensures the selection of procedures, examples of which have been given above, in the computer database of procedures, prepares an optimized flight path in case of emergency (engine failure, loss of communications, etc.), based on the emergency procedures database, the airspaces crossed, the airplane's performances, traffic, weather, relief, ensures the progress of this flight path and the sending of the flight path to the ground, if air-to-ground communication via Datalink is possible.

Figure 2:
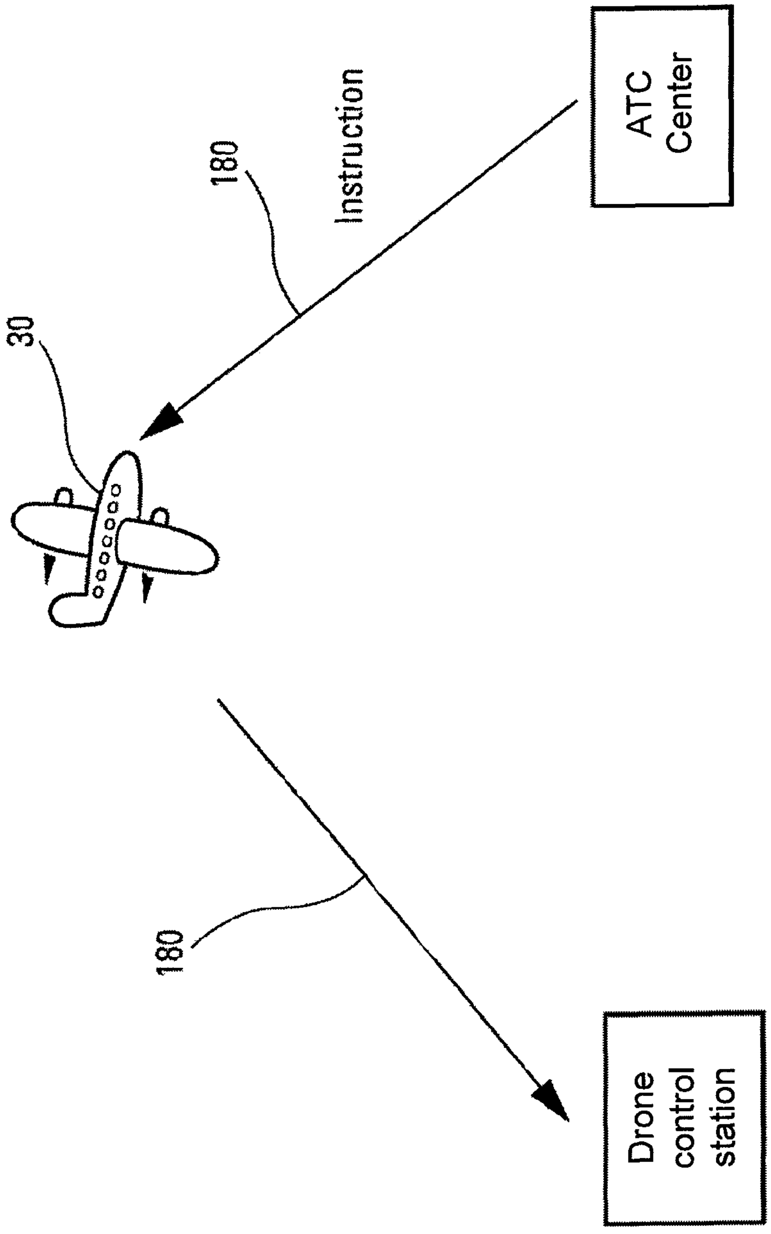
FIG. 2 shows the communication links of a drone.

FIG. 2 shows the communication links of a drone 30. The loss of the communication link between control and the drone poses a problem since the pilot on the ground no longer receives control instructions. Likewise, the loss of the communication link between the drone and the ground station means that the pilot on the ground is no longer aware of the "voice" instructions from the control centre. Depending upon which FMS functions are divided between ground and air and upon which of the communication links are lost, the pilot will or will not intervene in the execution of the procedures. In the extreme, in the event that all the links (ATC, ground station) are lost both ways, the proposed device and system enable fully automatic execution, on condition that all the necessary FMS functions are on board. The choice of optimum architecture must be made according to prescribed operational use conditions, taking into account the constraints of weight, space requirement and cost which lead to a transfer of computing power towards the ground station.

In the "manned aircraft" case, the process may further offer a number of strategies to the crew, enabling them to choose between several flight paths, observing all the regulations, but optimizing different criteria.

The preference function, also applicable in the case of unmanned aircraft, will most often favor enhanced safety in terms of minimum separation from other aircraft and relief elements, but it is easy to construct a preference function which will be capable of being programmed according to the operational context. Most often, a second best optimum obtained by parts will be sufficient. However, if the operational context calls for it, nothing prevents seeking a complete solution for the preference function optimum, on condition that the necessary computing power is available.

There are three main modes of embodiment of the invention, according to whether the aircraft is 'en route', on takeoff or on approach.

"En Route" Mode of Embodiment

The main elements of the process in the "En Route" case are specified below.

The FMS may extend cruising if necessary to keep a 20 min segment in front of the aircraft at constant level. It erases any STEPS that may be present in front of the aircraft in the 20 min interval. The FMS uses the "Constant Mach Segment" function on the points in front of the aircraft, at least over the predicted 20 mins, for flying at constant speed. In the event of terrain conflict, based on the MORA (Minimum Off Route Altitude), the FMS computes and inserts a "STEP CLIMB" in front of the aircraft to be 2000 feet above the highest MORA in the 20 min interval. Laterally, the FMS follows the active flight plan, but modifying the transitions (turns) between portions of the flight plan to remain compatible with the airplane speed. After said 20 mins, the FMS returns to the preprogrammed vertical flight plan, as well as to the preprogrammed speed by canceling the STEP and CMS that may have been entered in the first 20 min phase.

Then the FMS vertically controls the aircraft to follow the end-of-cruise and descent flight plan up to the approach point required by the procedure, namely the recommended beacon (if ICAO) or another point such as the IAF in France. This means full authority of the FMS over flight controls and thrust, as well as any surfaces. During its descent towards the chosen navigation aid, the FMS inserts a holding pattern in its flight plan, adopting the assumptions explained below.

If a HOLD is defined in the navigation database on the beacon or the IAF, the FMS inserts this HOLD; otherwise, it utilizes the HOLD function, with the following parameter settings:

Speed given by DO 236B according to altitude and weight category,

Bearing with respect to north, parallel to the arrival segment on the beacon/IAF, Default steering: Right, Length of the right portion: 1 minute.

An altitude constraint equal to the recommended minimum altitude over the beacon/IAF or equal to the next altitude constraint of the Intermediate part of the approach is inserted on the HOLD, while being raised by a possible MSA (Minimum Sector Altitude).

The FMS uses the "IMMEDIATE EXIT" function to exit the holding pattern when it predicts an arrival time compatible with the initially planned time, and adjusts the initiation of the function to ensure a landing within the 30 mins around the planned time.

In final approach, if an instrument approach was present in the FMS active flight plan, it follows this approach up to the landing; if no approach was entered, the FMS carries out the following procedure:

Test of the frequencies of the radionavigation means to detect the runways in use, by taking the ILS, MLS, GLS, VORDME, NDB signals in order Insertion of the runway which i) contains an ILS into the flight plan, or failing this, in order a MLS, GLS, VORDME, NDB, ii) is located by the aircraft (to avoid runway crossings)

Following the flight plan up to the landing

If all the tests are negative, stringing into the flight plan a "Runway by itself" approach (Autonomous Runway approach, only containing the runway and a half right in the runway track, from the runway threshold, on which the airplane may be guided) in the direction opposite to the wind measured on board and following this approach.

The other systems (Transponders) may transmit signals such as "TRANSMITTING BLIND", code 7700, according to the type of failure. This process will be adapted to take into account the specific features of each state/region. Thus, in Europe, the above 20 mins are replaced by 7 mins (Regional Supplementary Procedure Doc 7030/4).

Figure 3:
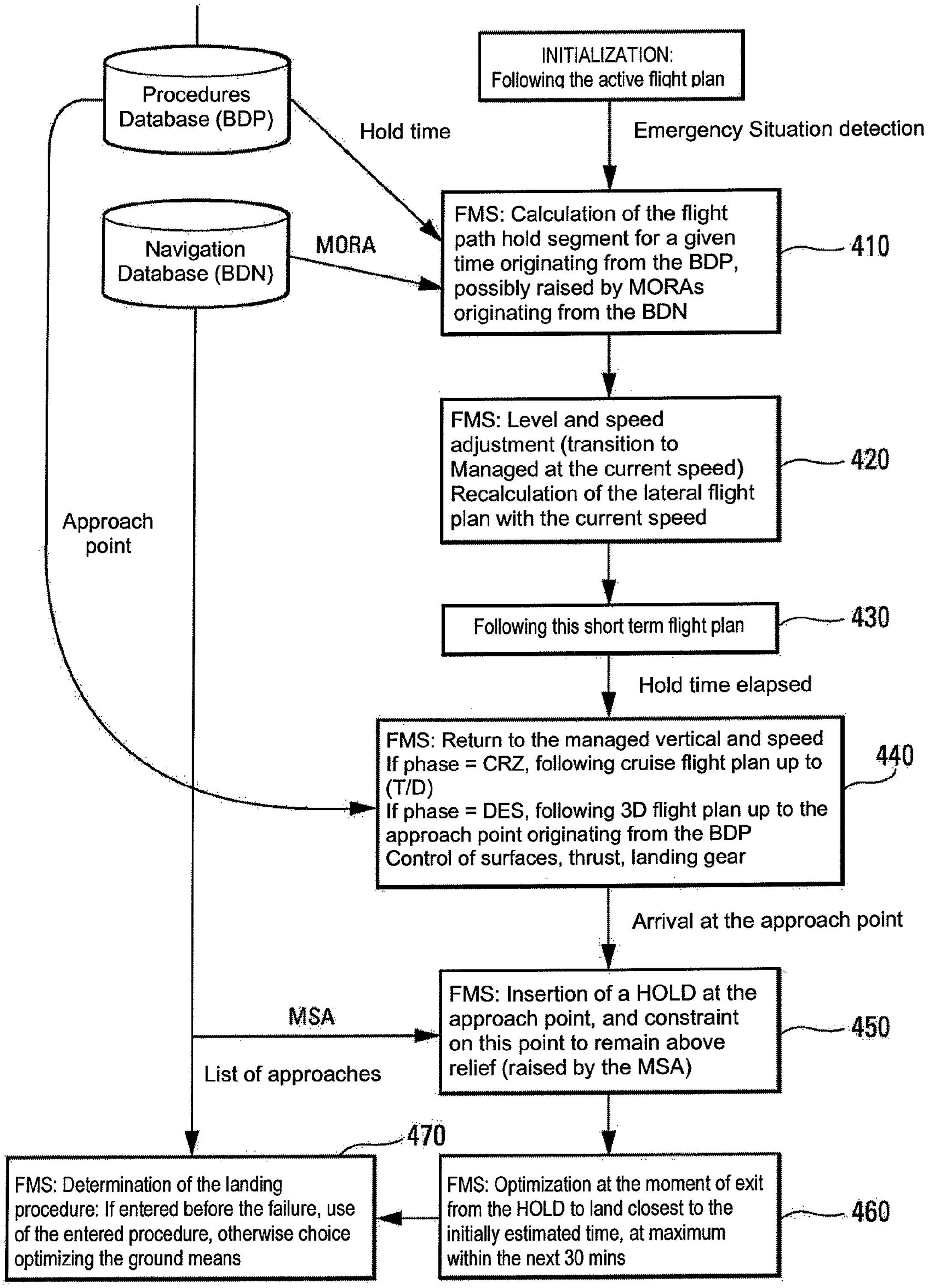
FIG. 3 displays the processing flow chart in a mode of embodiment of the invention in the case where the aircraft is 'en route'.
Figure 4:
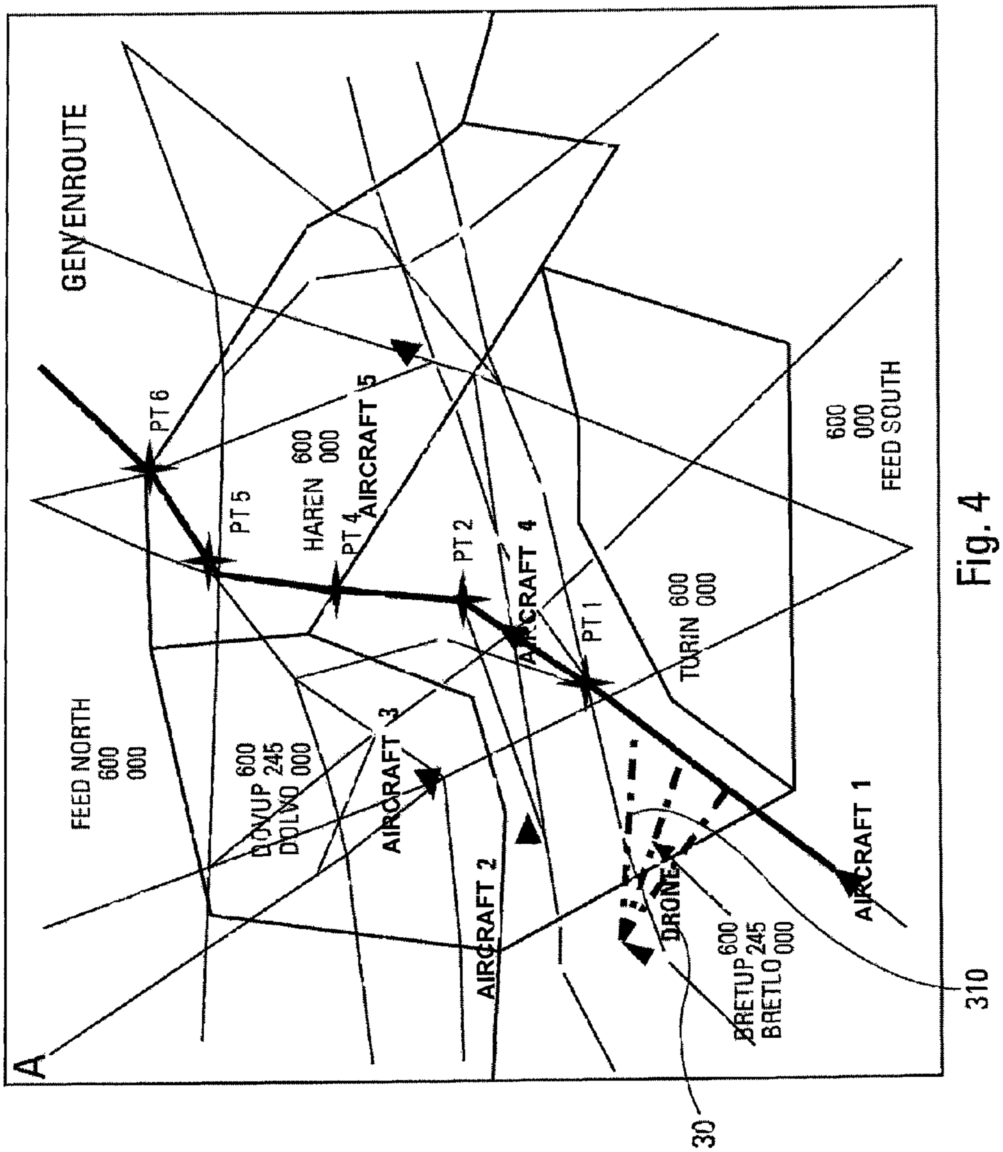
FIG. 4 shows a flight plan example in the case where the aircraft is 'en route'.

An example of embodiment of this 'En Route' case is described in detail for the flight plan in FIG. 4 which is located in the Brétigny sector. The processing flow chart in FIG. 3 shows the applicable steps of the procedure, which are described herebelow.

Step 1, (410, 420, 430): on detecting the failure: FMS:

Calculation of the flight path hold segment for a given time originating from the BDP, possibly raised by MORAs originating from the BDN and FMS;

Level and speed adjustment (transition to Managed at the current speed) Recalculation of the lateral flight plan with the current speed Following this short term flight plan The FMS checks to see whether there is a "hold time" in the current geographical area in the BDP. If so, it applies this time, if not, the ICAO value of 20 mins is used. In the example, a time of 7 mins is found and will be applied. During this period, the FMS freezes the speed of the aircraft at the current value and the level at the current level. The FMS calculates a rejoin onto the active flight plan by creating an orthogonal projection of the airplane onto it to identify the rejoin segment and making a turn whose angle optimizes the clearance with other aircraft. For this, one possibility is to test for a rejoin every 5°, between an intercept at 45° and an intercept at 90°; for each rejoin value. The FMS looks to see whether the other surrounding aircraft will cut across the rejoin track with a vertical clearance of less than 500 feet; for aircraft that cut across the rejoin segment, the FMS extrapolates the position of these aircraft from the speed and heading data obtained by interrogating the MODE S transponder of the aircraft in question (TCAS or ADS-B function); the FMS then compares the passage times of the aircraft that cut across the track with its passage times at the same point. The solution is the rejoin that maximizes the time deltas between the drone and the passing aircraft.

In the case of FIG. 4, the rejoin 310, which is the optimum solution, is that which makes an angle of 45° with the flight path.

Once the rejoin lateral flight path is obtained, the FMS checks the value of the MORAs from the BDN and where necessary adjusts the flight level, then it checks the absence of conflict in the vertical plane with other aircraft, at the level in question. If a conflict is detected, the algorithm loops back until it finds a solution.

Step 2, 440: Return to the managed vertical and speed after "hold time".

If phase=CRZ, following the cruise flight plan up to (T/D): If phase=DES, following 3D flight plan up to the approach point originating from the BDP; control of surfaces, thrust, landing gear.

One possible calculation algorithm is as follows: If the FMS predicts a rejoin onto the flight plan over a period greater than "hold time", it remains at constant speed and level until the rejoin, then goes back to "managed Speed and Vertical", that is, at the optimum level and speed calculated by the FMS; if the FMS predicts a rejoin before elapse of "hold time", it continues on the flight plan until reaching the "hold time", then goes back into "managed Speed and Vertical"; on arriving at the end-of-cruise point (T/D), the FMS reassigns the descent level to that of the approach point originating from the BDP and engages the descent.

Step 3, 450: Insertion of a HOLD at the approach point, and constraint at this point to remain above the relief (raised by the MSA).

The FMS inserts a HOLD at the approach point of the BDP in the following way: If a HOLD already exists at the approach point, the FMS uses this HOLD; otherwise, if a HOLD is coded in BDN at this point, the FMS inserts this HOLD; otherwise, the FMS inserts a HOLD with a right turn, length of right leg 1 min, ICAO speed. At the point of entry and exit of the HOLD, the FMS inserts an altitude constraint equal to the MSA retrieved from the BDP if it exists. Otherwise, the FMS inserts a constraint equal to the value of the ILS GLIDE beam intercept if it exists, and, if not, constructs a default approach and inserts a constraint equal to the deceleration level on this approach.

Step 4, 460: Optimization of the moment of exit from HOLD to land closest to the initially estimated time, and at the maximum in the next 30 mins.

If the projected landing weight is admissible for the runway, the FMS flies the HOLD until the predicted landing time matches the initially estimated time; otherwise, the FMS uses the 30 min slot until a landing weight is attained below the threshold authorized on the runway; in any case, at the end of 30 mins deviation from the estimated time, the FMS exits the HOLD and continues the approach.

Step 5, 470: Determination of the landing procedure

If entered before the failure, use of the entered procedure, otherwise choice optimizing the ground means. A possible algorithm is the following: If a procedure is coded before detection of the failure, the FMS follows this procedure; if no procedure is coded, the FMS searches for the approach procedure that maximizes precision, taking its on-board means into account. It will use in order: ILS, MLS, GLS, FLS, GPS, VOR/DME; if no approach is possible with the above means, the FMS produces a "Runway by itself" approach by stringing a segment in the runway track, with −3° of slope over 5 NM, on the opposite side to the wind. In any case, if the FMS detects a radionavigation means failure for carrying out the approach in question, it changes over to the "emergency landing procedure" algorithm explained in the corresponding example of embodiment. The FMS controls the extension of slats, flaps and landing gear on the approach, as the pilot would do, when it reaches the associated characteristic speeds.

"On Takeoff" Mode of Embodiment

The main elements of the process in the "On Takeoff" case are specified below. The procedures described are those to be employed in the event of communication failure only. There are other very different procedures for dealing with cases of engine failure, etc.

In the event of a situation of initiating an emergency procedure due to a communication failure on takeoff, almost all the procedures to be employed are of the type: "Continue flying up to the limit of the TMA, following the SID procedure at the last allocated altitude, or if this is not compatible with the existing obstacles, position yourself at the minimum safety altitude. Then, climb to the cruise altitude indicated by the active flight plan." This very common type of procedure may be expressed in the following way in a flight management system: Aircraft in MANAGE (fully automatic control);

insertion of an "AT OR BELOW" altitude constraint at the SID points, equal to the last level assigned by control, where applicable raised by the MSA (avoidance of an obstacle); holding at this level until the geographical limits of the TMA, to be coded into a database; return to the FMS active flight plan, which will automatically switch over to climbing up to cruise level entered on the ground; application of the "En Route" procedure described above.

According to the regions/states/airfields, adjustments marked on the maps may be necessary. They are coded into the BDP.

Figure 6:
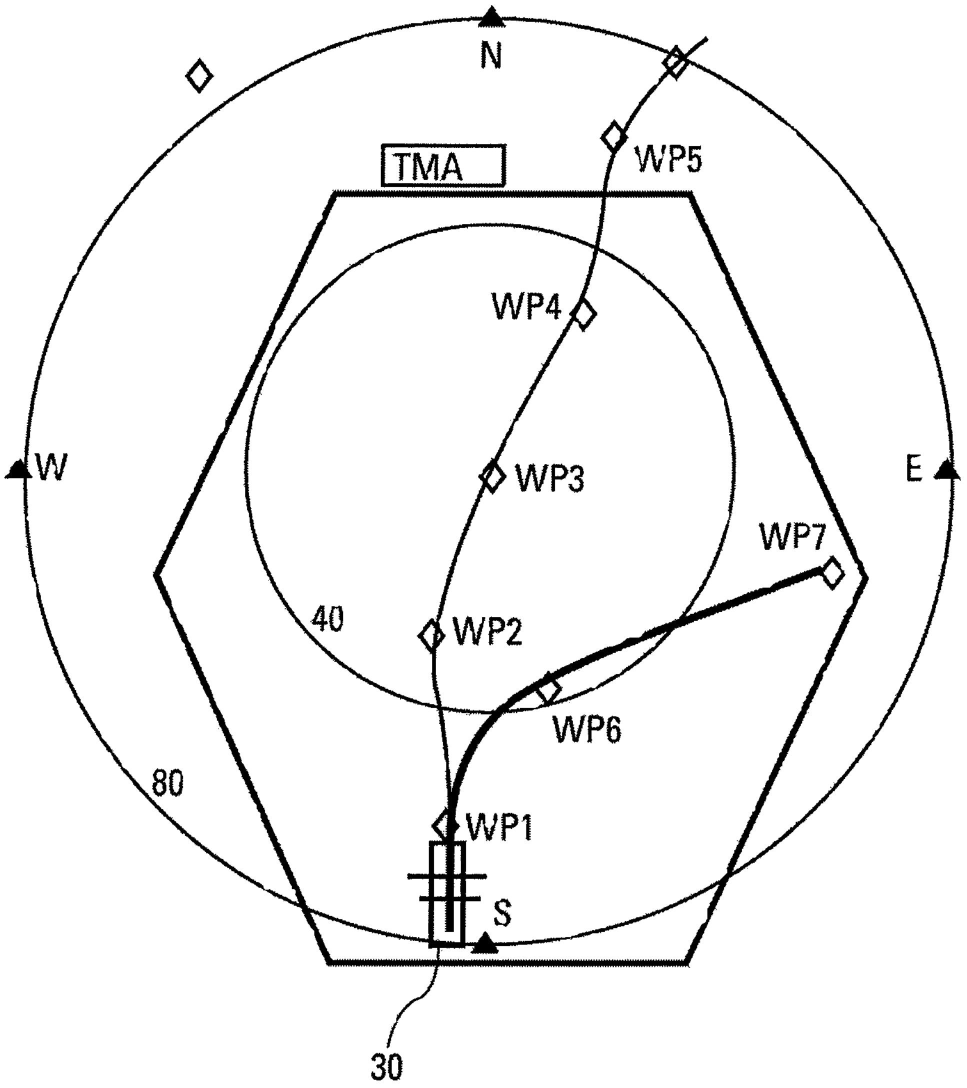
FIG. 6 shows a flight plan example in the case where the aircraft is on takeoff.

This "On Takeoff" mode of embodiment is illustrated by the example in FIG. 6. The aircraft is down below and has just taken off. The active flight plan passes through the points WP1 . . . WP5. Points WP1 . . . WP4 are the points of the SID, and point WP5 is the first point of the "EN ROUTE" part. The "comm failure" flight plan stored in BDP, passes through WP1, WP6, WP7.

The hexagon represents the TMA.

Figure 5:
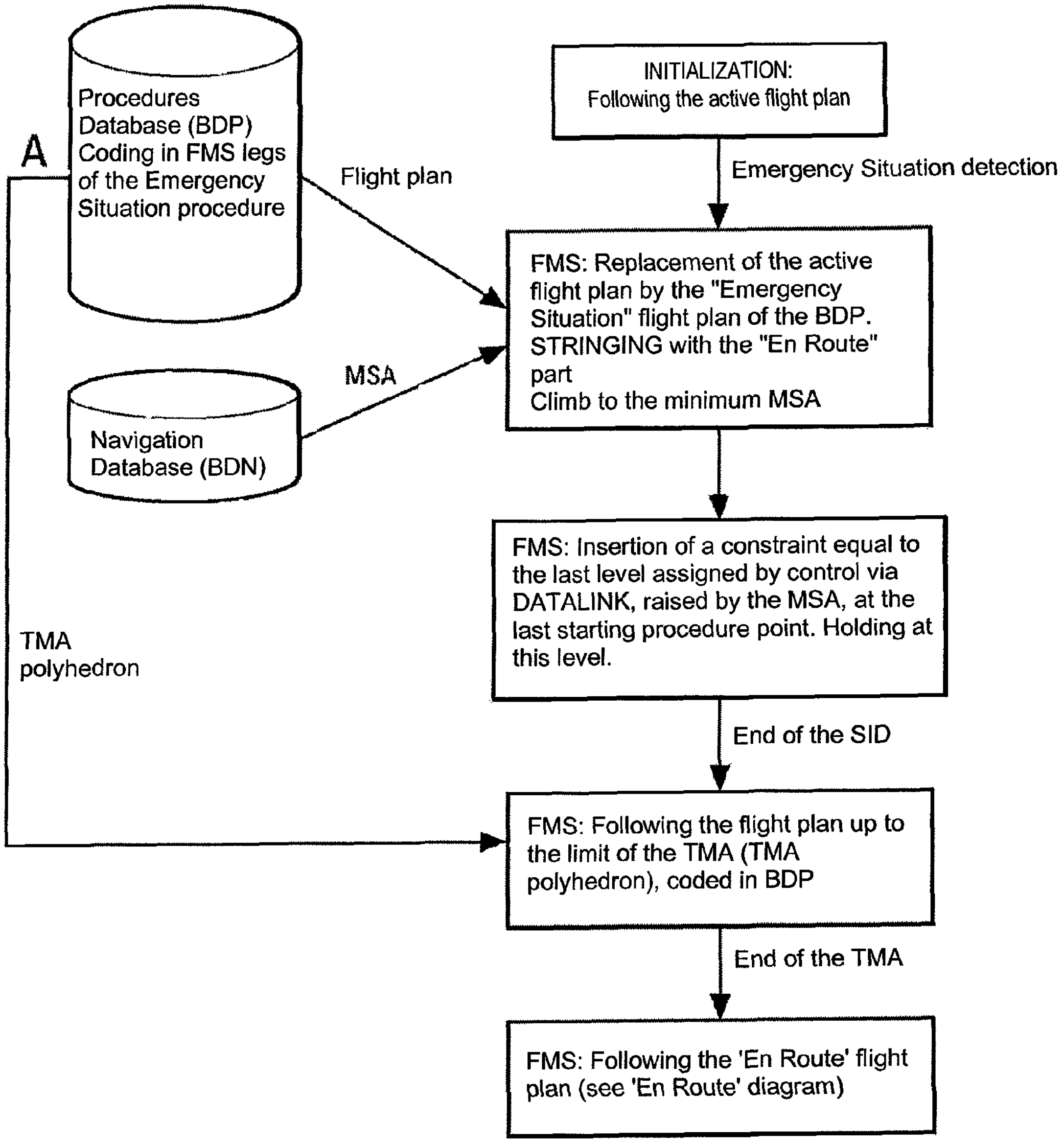
FIG. 5 displays the processing flow chart in a mode of embodiment of the invention in the case where the aircraft is on takeoff.

The processing flow chart of this mode of embodiment for this example is that in FIG. 5.

By calling up the BDP, the FMS loads the "Emergency Situation" flight plan applicable to the emergency situation detected in the current phase. The FMS loads the coordinates of the characteristic points of the TMA and determines the first point outside of the TMA on the active flight plan (here WP5). The FMS strings the "Emergency Situation" flight plan onto this first point, minimizing the distance and following the outlines of the TMA; the following is a possible algorithm: A margin of X NM (5 NM for example) is determined with respect to the polyhedron, at the level of the polyhedron break points, a point is created on the bisector segment, 5 NM from the outline; then these points are connected up to WP5; this calculation is made starting from both the left and the right, at the end of the "Emergency Situation" flight plan and the one with the least distance is kept.

At the vertical profile level, "AT OR ABOVE" altitude constraints are inserted on the points of this flight plan at the value of the MSA of the sector originating from the BDN on the "Emergency Situation" starting procedure points. The FMS assigns a cruise level equal to the last level obtained from control. No constraint is inserted on the last starting procedure point (here WP7), just as on the next EN ROUTE points (here WP5), so that the climb profile is calculated to climb to the cruise level, i.e. to the last level assigned by control. The FMS guides along this flight plan then passes onto the "En Route Emergency Situation" part.

"On Approach" Mode of Embodiment

The main elements of the process in the "On Approach" case are specified below. The procedures described are those to be employed in the event of communication failure only. There are other very different procedures for dealing with cases of engine failure, etc.

Figure 8:
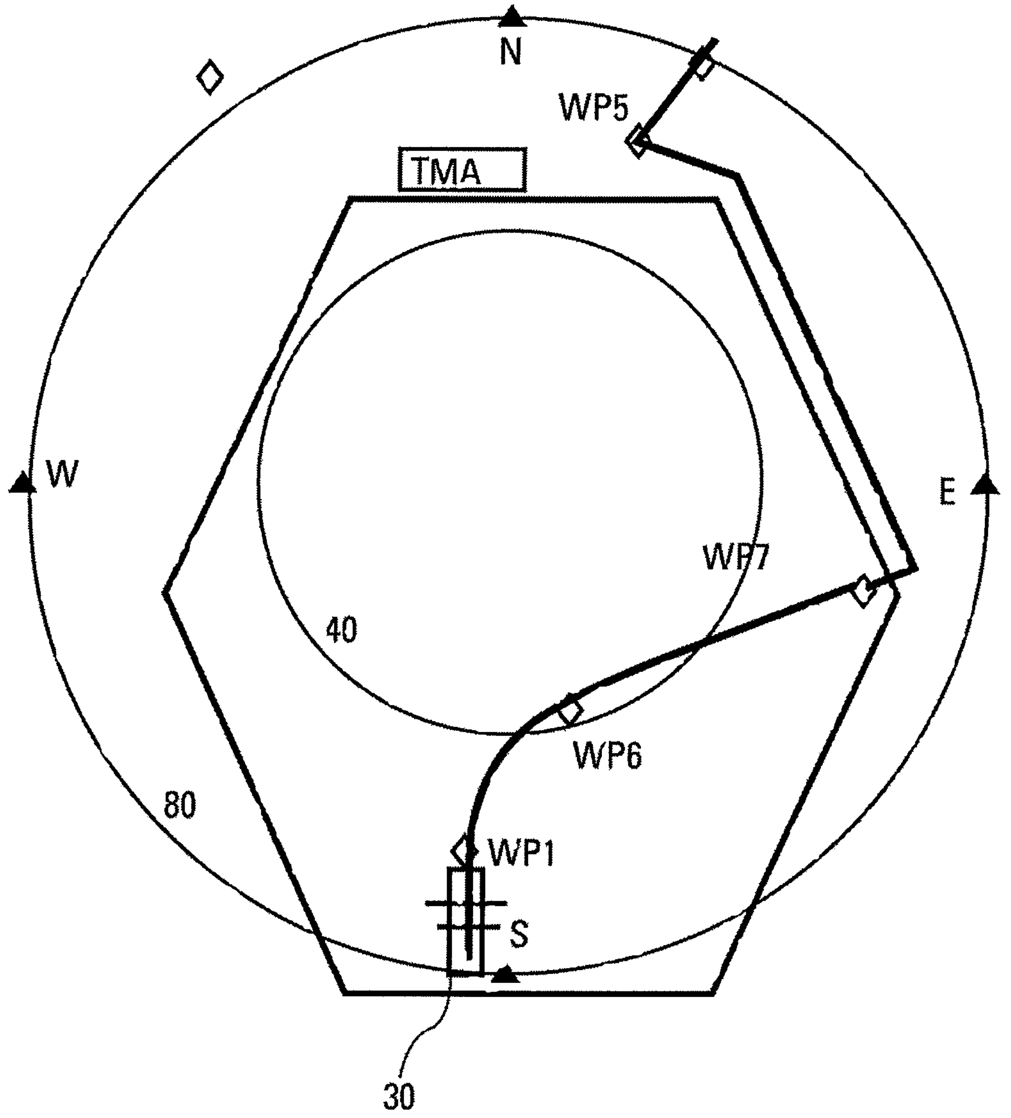
FIG. 8 shows a flight plan example in the case where the aircraft is on approach.

In the event of communication failure on landing, it is generally required to employ the missed approach (MISSED APPROACH) procedure, then in the event of repeated failure, to employ the "LEAVING PROCEDURE". "LEAVING PROCEDURES" are almost always instructions for following SID and radials towards predetermined beacons. For example, for NICE (France) "After missed approach, climb to 2500 feet and then leave the Nice TMA at 2500 feet in the VOR "NIZ" R-126 direction. The coding of this procedure in the FMS is possible via the addition of ARINC 424 legs, of the CA 2500 type ("Course to an altitude equal to 2500 feet"), followed by a CR 126NIZ leg ("Course to a RADIAL 126° MAG from VOR "NIZ"), and can therefore be included in the aircraft's navigation database. All the procedures for leaving the TMA can be coded in a database. What the FMS has to do is to create a new type of link between the end of the missed approach and this procedure. This "On Approach" mode of embodiment is illustrated by the example in FIG. 8 where the NANTES TMA is shown. The procedure is: "In the case where the pilot has no knowledge of the runway in use, employ the procedure for RWY03 (A circle before landing may be necessary if the wind observed by the pilot indicates that RWY21 is in use). In the event of a missed approach, employ the corresponding published procedure and begin a second approach. If the second approach fails, follow the applicable corresponding procedure then leave the TMA at 3000 feet and try to attain VMC".

Figure 7:
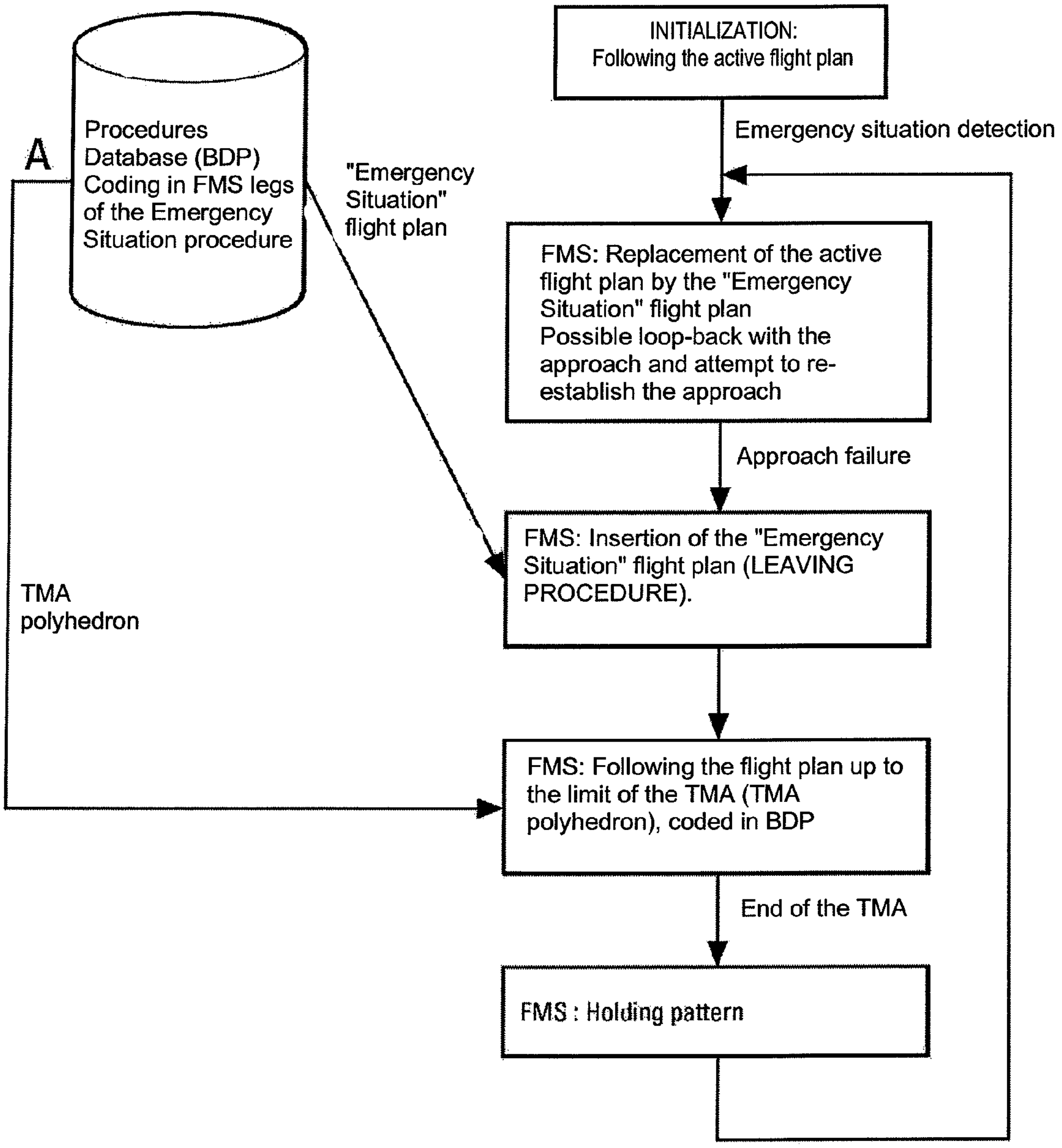
FIG. 7 displays the processing flow chart in a mode of embodiment of the invention in the case where the aircraft is on approach.

The processing flow chart of this example of embodiment is given in FIG. 7.

In the case of the drone, there is no possibility of following the visual conditions procedure (VMC) since the pilot cannot "see" the runway. A possible algorithm will therefore be: If a complete approach has been entered before the "Emergency Situation", the FMS follows the procedure described in the "En Route Emergency Situation" part, starting from step 5; if no runway has been entered, the FMS retrieves the possible landing runways from the BDP (here RWY03 or 21) and determines the runway in use thanks to the wind. In the absence of wind, the FMS uses the runway recommended in the BDP (here RWY03); the FMS then switches over to step 5 of the "En Route" part to determine the best radionavigation means for landing on this runway.

If the "Emergency Situation" is initiated during a go-around (Missed Approach), i.e. while the pilot on the ground is performing a go-around, then the FMS retrieves the "Emergency Situation" flight plan from the BDP (here continuation of the Missed Approach then attempt at second approach. The FMS then switches over to step 5 of the "En Route" part to determine the best radionavigation means for landing on this runway. In the case of the drone, the LEAVING TMA procedure is not employed since VMC conditions are inapplicable. The drone will continue its approaches until it succeeds in one, even if it must lead to damage to the craft.

In the case of a manned aircraft, the process may follow the procedure to the end. The FMS will therefore offer to follow the same routing as above and, in the event of a $2^{nd}$ landing failure, will retrieve the TMA polyhedron from the BDP, string a straight line to the last Missed Approach point in the axis of this last segment up to the TMA limit, possibly constraining the created points in altitude (here 3000 feet). In the event of a succession of missed approaches, the last emergency procedure will normally be the intervention of fighter planes which will guide the aircraft in its landing.

For a manned aircraft, this will spare some time for the ground control center to initiate a repartition of the craft by fighter planes. A drone as already mentioned, will attempt to land whatever the cost, including damages.

The procedures described here are those to be applied only in case of communication failure. There are other very different procedures to address the situation like engine failure of the emergency situations.

The invention claimed is:

1. A navigation aid device positioned onboard an aircraft, the navigation aid device comprising:

a flight plan/path preparation module configured to prepare a flight plan and a flight path of the aircraft;

a storage element configured to store a computer database of procedures associated with predefined emergency situations; and a computer processing element coupled to the flight plan/path preparation module and the storage element and configured to cause the flight plan/path preparation module to modify, onboard the aircraft and under control of a crew of the aircraft, the flight plan or the flight path in accordance with a modification proposed by the computer processing element based on at least one of the procedures from the database corresponding to at least one of the predefined emergency situations and a preference function of a combination of navigation criteria.

2. The navigation aid device of claim 1, wherein the computer database of procedures comprises data relating to landing and takeoff maneuvers, and at least a portion of the data is in the form of flight path segments that are usable by the flight plan/path preparation module.

3. The navigation aid device of claim 1, wherein the storage element comprises one or several elements for entirely or partially updating said computer database.

4. The navigation aid device of claims 1, further comprising a localization module, wherein the computer processing element cooperates with said localization module and the flight plan/path preparation module to select the at least one of the procedures from the computer database applicable to an emergency situation of the aircraft according to an 'en route,' approach, or takeoff situation of the aircraft.

5. The navigation aid device of claim 1, further being configured to detect an emergency situation of the aircraft and to initialize the computer processing element.

6. The navigation aid device of claim 1, wherein the computer processing element is further configured to select and present a plurality of compliant and optimum modifications to the flight plan or the flight path to the crew of the aircraft and to allow said crew to choose among said presented compliant and optimum modifications.

7. The navigation aid device of the claim 1, further comprising an interface couples with an automatic piloting module of the aircraft, wherein the computer processing element is configured to control said automatic piloting module to ensure an execution of the modified flight plan or the modified flight path without intervention of a pilot of the aircraft.

8. The navigation aid device of claim 1, wherein the procedures associated with the predefined emergency situations are in compliance with international or state regulations.

9. An aircraft navigation aid method comprising:

preparing a flight plan and a flight path for said aircraft using a navigation database stored on board the aircraft;

in response to an initiation of an emergency situation among a set of predefined emergency situations, selecting, on board of the aircraft, at least one of procedures stored in a computer database of procedures;

modifying, on board of the aircraft and under control of a crew of the aircraft, the flight plan or the flight path in accordance with a modification proposed by a computer processing element based on the selected at least one of the procedures and a preference function of a combination of navigation criteria.

10. The aircraft navigation aid method of claim 9, further comprising performing localization of the aircraft, wherein the selection of stored procedures includes choosing the at least one of the procedures according to the localization and the 'en route,' approach, or takeoff situation of the aircraft.

11. The aircraft navigation aid method of claim 9, further comprising:

detecting the emergency situation; and initializing the selection of the stored procedures to be executed in said emergency situation.

12. The aircraft navigation aid method of claim 9, wherein the modifying the flight plan or the flight path comprises selecting and presenting compliant and optimum modifications to the flight plan or the flight path to the crew of the aircraft to allow said crew to choose among said compliant and optimum modifications.

13. The aircraft navigation aid method of claim 9, further comprising automatically piloting the aircraft for ensuring an execution of the modified flight plan or the modified flight path without intervention of a pilot.

14. The aircraft navigation aid method of claim 9 further comprising, in response to a failure of one of the aircraft's communication links occurring when the aircraft is 'en route':

calculating a flight plan hold segment enabling the flight path to be held for a given hold time originating from the computer database of procedures, the flight hold segment being compliance with a minimum altitude constraint from the navigation database;

calculating the flight path to rejoin said flight plan hold segment, then following said flight plan hold segment;

on expiration of said hold time, following a convergence towards an approach point prescribed by the computer database of procedures;

on arrival at said approach point, following the flight plan hold segment for a predetermined duration, the predetermined duration being calculated so that a landing time lies within a prescribed interval;

on expiration of said predetermined duration, landing the aircraft based on a procedure entered by a control center before the communication failure or a calculated procedure.

15. The aircraft navigation aid method of claim 14, wherein the calculating the flight path to rejoin the flight plan hold segment is performed under the constraint of optimizing clearance with the other aeroplanes in the vicinity.

16. The aircraft navigation aid method of claim 15, wherein the rejoining turn of the flight plan hold segment makes an angle with said segment which maximizes a time separation kept by the aircraft to rejoin said segment and those kept by the aeroplanes in the vicinity to rejoin a point vertical from the approach point, said aeroplanes in the vicinity taken into consideration being those whose flight path passes at a vertical distance less than a prescribed minimum from the rejoin point.

17. The aircraft navigation aid method of claim 14, wherein the predetermined duration is calculated taking into account a authorized landing weight.

18. The aircraft navigation aid method of claim 14, wherein the calculated procedure is calculated using a ground landing aid means in an optimum manner.

19. The aircraft navigation aid method of claim 18, wherein the ground landing aid means comprises a prescribed order of said means or a preprogrammed automatic approach.

20. The aircraft navigation aid method of claim 9 further comprising, in response to a failure of the communication link between the aircraft and an air traffic control occurring when the aircraft is on takeoff situation:

loading a communication failure flight plan from the computer database of procedures and coordinates of characteristic points of a terminal area (TMA) and determining a first characteristic point outside said terminal area;

stringing said communications failure flight plan onto said first characteristic point, said stringing being calculated to minimize the rejoin distance by following an outline of the TMA.

21. The aircraft navigation aid method of claim 20, wherein the calculation for minimizing the rejoin distance by following the outline of the TMA includes:

for a chosen TMA bypass margin, creating pairs of flight path points on bisector segments created at inflection points of the TMA, each of the points of the pair being located at a distance from the inflection points corresponding to the chosen bypass margin of said TMA;

calculating total distances to be traveled by the aircraft over flight paths connecting a current position of the aircraft to the first characteristic point outside the terminal area passing through the possible flight path points;

determining a flight path, from among the flight paths having a shortest total distance to be traveled by the aircraft;

allocating a cruise altitude equal to the last instruction received from the air traffic control with a climb profile integrating a minimum altitude constraints of a corresponding sector of the TMA; and switching to a procedure for determining a flight plan in response to a communication link failure between the aircraft and the air traffic control occurring when the aircraft is ‘en route’.

22. The aircraft navigation aid method of claim 9, further comprising, in response to a failure of the communication link between the aircraft and an air traffic control occurring when the aircraft is on approach without the possibility of following a visual conditions procedure:

determining a landing runway from the computer database of procedures, either that resulting from taking into account a measured wind or that recommended by said database; and landing the aircraft according to optimization of the use of a ground landing aid means having a prescribed order in the use of said means or the use of a preprogrammed automatic approach.

23. The aircraft navigation aid method of claim 9, wherein the procedures stored in the computer database of procedures are in compliance with international or state regulations.

* * * * *